(12) United States Patent
Tsen et al.

(10) Patent No.: US 11,506,611 B2
(45) Date of Patent: Nov. 22, 2022

(54) SURFACE-ENHANCED RAMAN SCATTERING DETECTION METHOD FOR RAPID DETECTION OF PESTICIDE RESIDUES

(71) Applicant: Phansco Co., Ltd., Hsinchu (TW)

(72) Inventors: Chao-Ming Tsen, Kaohsiung (TW); Ching-Wei Yu, Taipei (TW); Wei-Chung Chao, Hsinchu (TW); Yung-Hsiang Wang, New Taipei (TW); Cheng-Chien Li, Hsinchu (TW); Shao-Kai Lin, Taichung (TW); Tzu-Hung Hsu, Taichung (TW); Chang-Jung Wen, Hsinchu (TW)

(73) Assignee: PHANSCO CO., LTD., Hsinchu (TW)

( * ) Notice: Subject to any disclaimer, the term of this patent is extended or adjusted under 35 U.S.C. 154(b) by 492 days.

(21) Appl. No.: 16/632,824

(22) PCT Filed: Jul. 20, 2017

(86) PCT No.: PCT/CN2017/093637
§ 371 (c)(1),
(2) Date: Jan. 21, 2020

(87) PCT Pub. No.: WO2019/014887
PCT Pub. Date: Jan. 24, 2019

(65) Prior Publication Data
US 2020/0158646 A1    May 21, 2020

(51) Int. Cl.
*G01N 21/65*  (2006.01)
*G01N 1/34*  (2006.01)

(52) U.S. Cl.
CPC ............ *G01N 21/658* (2013.01); *G01N 1/34* (2013.01); *G01N 2201/06113* (2013.01)

(58) Field of Classification Search
CPC ............... G01N 1/34; G01N 21/658; G01N 2201/06113; G01N 1/405; G01N 21/65
See application file for complete search history.

(56) References Cited

U.S. PATENT DOCUMENTS 3,380,876 A * 4/1968 Rusher ................. C09D 171/02
156/276
5,261,165 A * 11/1993 Tate .......................... F26B 3/30
34/68

(Continued)

FOREIGN PATENT DOCUMENTS

| CN | 103983504 A | 8/2014 |
| CN | 104597195 A | 5/2015 |

(Continued)

*Primary Examiner* — Violeta A Prieto
(74) *Attorney, Agent, or Firm* — Muncy, Geissler, Olds & Lowe, P.C.

(57) ABSTRACT

A surface-enhanced Raman scattering (SERS) detection method is provided for detecting a target analyte in a sample. The SERS detection method generally includes the steps of: (a). preparing an extract of the sample; (b). introducing the sample extract onto a SERS substrate, causing the target analyte to be absorbed in the SERS substrate; (c). introducing a volatile organic solvent onto the SERS substrate to have the target analyte of the sample extract dissolved and comes out of the SERS substrate; (d). irradiating the SERS substrate with light to evaporate the volatile organic solvent, leaving a more condensed target analyte on the SERS substrate; (e). irradiating the condensed target analyte with laser light to have the target analyte penetrate deeply into the SERS substrate; and (f). performing Raman measurement with a laser beam focusing on the SERS substrate to analyze the target analyte.

10 Claims, 6 Drawing Sheets

(56) References Cited

U.S. PATENT DOCUMENTS

| | | | |
|---|---|---|---|
| 2004/0018310 A1* | 1/2004 | Badesha | G03G 15/2057 427/385.5 |
| 2005/0214548 A1* | 9/2005 | Ron | B41C 1/1033 428/447 |
| 2006/0077382 A1 | 4/2006 | Wang et al. | |
| 2009/0270291 A1* | 10/2009 | Matsumura | C10M 107/34 427/407.1 |
| 2011/0063612 A1* | 3/2011 | Sun | G01N 21/658 977/954 |
| 2011/0176130 A1* | 7/2011 | Gu | G02B 6/02385 977/773 |
| 2013/0182249 A1* | 7/2013 | Weiss | B82Y 30/00 117/88 |

FOREIGN PATENT DOCUMENTS

| | | |
|---|---|---|
| CN | 104749159 A | 7/2015 |
| CN | 104931483 A | 9/2015 |
| CN | 106153600 A | 11/2016 |
| CN | 107643276 A | 1/2018 |
| TW | M506286 U | 8/2015 |

* cited by examiner

SURFACE-ENHANCED RAMAN SCATTERING DETECTION METHOD FOR RAPID DETECTION OF PESTICIDE RESIDUES

FIELD OF THE INVENTION

The present invention relates to a method of detecting pesticide residues, and more particularly to a method for detecting pesticide using surface-enhanced Raman spectroscopy with a special substance concentration technique.

BACKGROUND OF THE INVENTION

With the excessive use of pesticide products in Taiwan's agriculture industry, there lies many hidden problems of excessive pesticide residues. In the past few years, excessive pesticide residues have been detected in rice, tea, and various vegetables and fruits, thus, it has become an important subject to establish an on-site detection and monitoring mechanism for pesticide residues on crops.

The instrument currently used to detect the composition and concentration of pesticide is LC/MS-MS or GC/MS-MS. However, the mass spectrometer has a high sensitivity, but it can only perform in the lab and would take a considerable amount of time for measurement. In particular, the mass spectrometer requires the use of a so-called QuEChERS ("Quick, Easy, Cheap, Effective, Rugged, and Safe") method before measurement to conduct extraction and cleanup process of a sample. Generally, it takes about two hours to extract the sample with QuEChERS.

Unlike the mass spectrometer in the lab, Taiwan Patent No. M506286 discloses a device for detecting pesticide products. The detection device employs a SERS substrate and a Raman mass spectrometer that is able to achieve the purpose of quickly detecting active ingredients of pesticide. In general, the critical success factor of the Raman spectroscopy is the Raman signal intensity. To obtain a stronger Raman signal, the patent teaches that the sample may be irradiated by laser light for a suitable time, usually 2 to 3 seconds prior to analysis by Raman spectroscopy, in order to enhance the binding between the pesticide molecules and the metallic surface of the SERS substrate, thereby improving the Raman signal intensity.

China Patent Pub. No. CN104749159 and CN104931483 discloses a similar SERS detection method for detection of pesticide residues. In order to enhance the Raman signal intensity, these patents mixes a sample with metal nano-enhancement material (such as silver or gold nanoparticles), and then irradiate them with laser to obtain a Raman signal with sufficient intensity.

SUMMARY OF THE INVENTION

Different from prior arts, the present invention provides a method to enhance the Raman signal while detecting pesticide or chemical substance measurement, the method combines the conventional surface-enhanced Raman spectroscopy and an original concentration technique to quickly detect the active ingredients of pesticide and pesticide residues of agricultural products. This special concentration technology can effectively enhance the Raman signal intensity, and thereby greatly improve the detection sensitivity and reliability.

Specifically, the SERS detection method of present invention generally includes the steps of (a). obtaining a sample extract from extracting and cleaning a sample; (b). introducing the sample extract onto a SERS substrate so that chemical molecules of the sample extract is absorbed in the SERS substrate; (c). introducing a highly volatile organic solvent onto the SERS substrate that has absorbed the chemical molecules of the sample extract, whereby the chemical molecules of the sample extract dissolves in the volatile organic solvent and comes out of the SERS substrate; (d). irradiating the SERS substrate with light to evaporate the volatile organic solvent, leaving condensed chemical molecules in a concentrated area of the SERS substrate; (e). irradiating the concentrated area of the SERS substrate with laser light to have the condensed chemical molecules penetrate deeply into the concentrated area of the SERS substrate, forming a solid sample spot for measurement; and (f). performing Raman measurement with a laser beam focusing on the solid sample spot of the SERS substrate to analyze the condensed chemical molecules.

Preferably, in step (a), in step (a), in order to obtain the sample extract, the sample is extracted by using a reagent selected from the group consisting of acetone, methanol, acetonitrile, and acetonitrile/acetic acid solution.

Preferably, in step (a), the sample is extracted with organic solvent and then put through a cleanup column and a microporous filter in sequence to get the sample extract.

Preferably, in step (c), the volatile organic solvent is a diluted solution including a diluting agent and a material selected from acetone, methanol or ethanol.

Preferably, the diluting agent is selected from the group consisting of de-ionized water, methanol and acetonitrile.

Preferably, in step (d), the light for irradiating the SERS substrate is infrared light with a wavelength of about 760 nm to 2000 nm; and in step (e), the laser light for irradiating the concentrated area of the SERS substrate has a wavelength of about 760 nm to 1500 nm, and is generated from a laser light source with an output power no more than 500 mW.

Preferably, in step (e), the laser light for irradiating the concentrated area of the SERS substrate has a single wavelength.

In another perspective, the present invention is directed to a chemical substance concentration method, which includes the steps of: (a). introducing a sample solution onto a metallic substrate, whereby chemical molecules of the sample solution are absorbed in the metallic substrate; (b). introducing a highly volatile organic solvent onto the metallic substrate, whereby the chemical molecules in the metallic substrate dissolve in the volatile organic solvent and come out of the metallic substrate; and (c). evaporating the volatile organic solvent in order to concentrate the chemical molecules of the sample solution in a concentrated area of the metallic substrate.

Preferably, in step (c), the volatile organic solvent on the metallic substrate is irradiated with infrared light for the rapid evaporation.

Preferably, after the step (c), the concentrated area of the metallic substrate is further irradiated with infrared laser light to have the chemical molecules penetrate deeply into the metallic substrate.

It shall be noted that this chemical substance concentration method may not only be employed in the aforementioned SERS detection method, but also be applied to any other technical field in another suitable way.

The numbers in the figure have the following meanings:

1: SERS substrate; 11: silicon substrate; 12: metallic nano/microstructure; 2: laser light source; 3: Raman spectrometer; 4: sample extract; 41: chemical molecules (pesticide molecules); 5: organic solvent; L1: infrared light; L2: infrared light

DETAILED DESCRIPTION OF EMBODIMENTS

Figure 1:
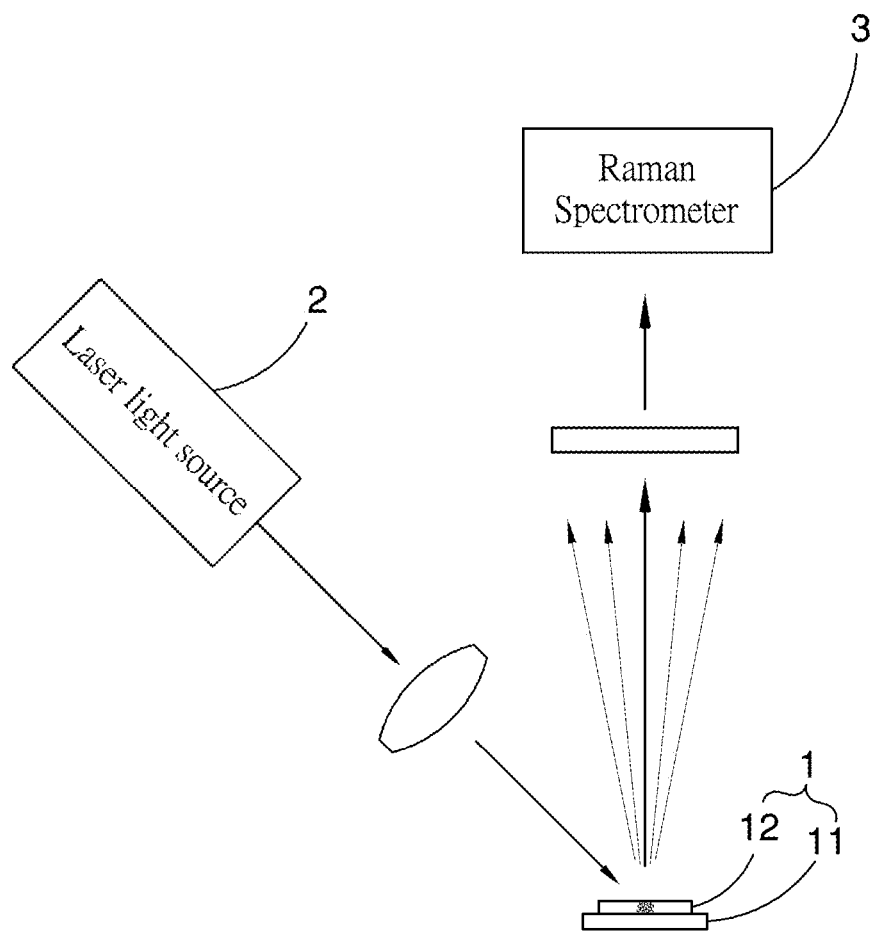
FIG. 1 is a schematic diagram of a SERS detection system in accordance with the preferred embodiment of the present invention.
Figure 2:
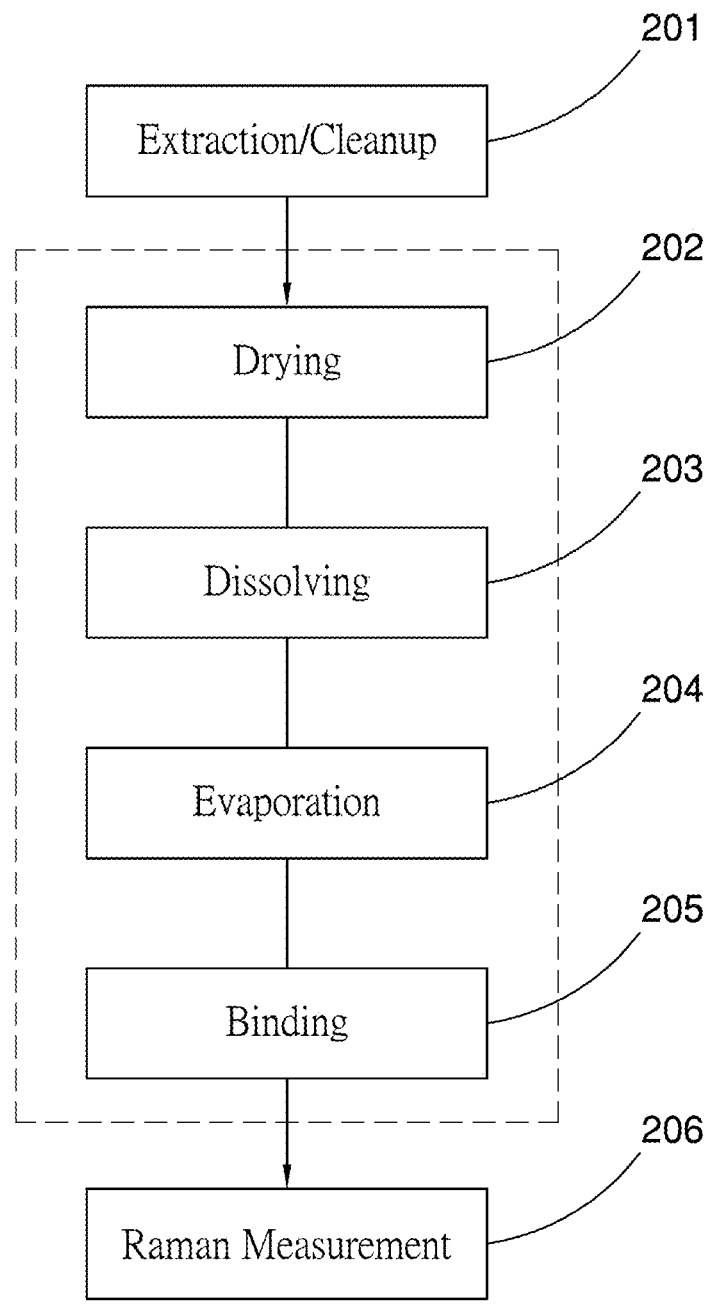
FIG. 2 is a flow diagram of a SERS detection method in accordance with the preferred embodiment of the present invention.

Referring to FIGS. 1 and 2, there is shown a preferred embodiment of a pesticide detection system and method of the present invention, wherein the pesticide detection method involves the use of a SERS substrate 1, a laser light source 2 and a Raman spectrometer 3 for a rapid, in-situ detection of the pesticide residues. The pesticide detection method, also known as surface-enhanced Raman scattering detection method. The SERS substrate 1 includes a 2.2 mm×2.2 mm square of silicon substrate 11 and a metallic nano/microstructure 12 deposited on the silicon substrate 11 using physical vapor deposition technology. Metallic material, such as Au, Ag or Cu, may be used for forming the metallic nano/microstructure 12 on the silicon substrate 11. For example, the metallic nano/microstructure 12 may be formed of silver nanopillars with a thickness of about 320 nm.

Referring to FIG. 2, the SERS detection method generally involves three stages, including pretreatment, concentration and measurement. In the pretreatment stage, a sample to be detected may be prepared by using a simple extraction/cleanup method (step 201) or a conventional, more complicated QuEChERS method. In the concentration stage, there are drying (step 202), dissolving (step 203), evaporation (step 204) and binding (step 205). In the final measurement stage, the sample is analyzed in the Raman spectrometer (step 206). As detailed below:

Specifically, the SERS detection method of the present invention includes the following steps: Firstly, in step 201, a sample (such as agricultural products) to be detected is extracted with organic solvent, and followed by a cleanup step to produce a clean sample extract for analysis. In practice, the original sample may be homogenized in a blender and put in a centrifuge tube with the organic solvent and agitated for a while. The organic solvent used for extraction may be acetone, methanol, acetonitrile, or acetonitrile/acetic acid solution, depending on the type of sample to be analyzed. Following this, an extract of about 20 mL to 0.2 mL from the sample is put through a cleanup column as well as a microporous filter with pore size of about 1 µm to produce a clean sample extract for analysis.

Figure 3:
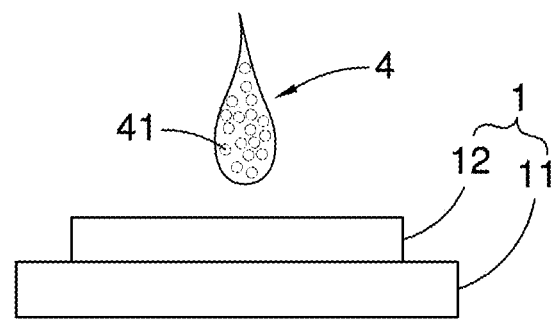
FIGS. 3-10 illustrate a chemical substance concentration process using a SERS substrate.
Figure 4:
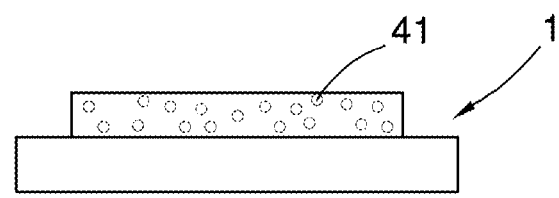

Next, as shown in FIG. 3, the clean sample extract 4 of about 10 µL to 0.2 µL is dripped on a SERS substrate 1 and leaved on for a while until the sample extract 4 is dried (step 202). When the sample extract 4 is dried, the target analyte of the sample extract 4 (in form of chemical molecules 41), if present in the sample extract 4, will be dispersed and absorbed in the SERS substrate 1, creating a binding with the metallic nano/microstructure 12 of the SERS substrate 1, as shown in FIG. 4.

Figure 5:
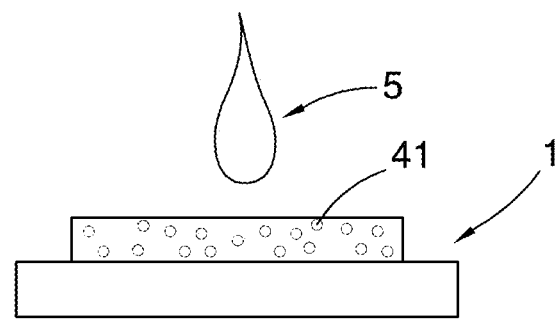
Figure 6:
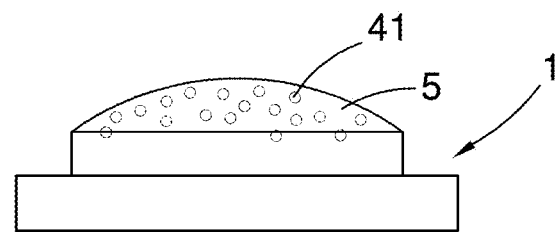

As shown in FIG. 5, a droplet of highly volatile organic solvent 5 is introduced on the SERS substrate 1 such that the chemical molecules 41 of the extract 4 absorbed in the SERS substrate 1 may come out of the SERS substrate 1 and dissolve in the organic solvent 5 (step 203), as shown in FIG. 6. The volatile organic solvent used here may be a diluted acetone, methanol or ethanol using a diluting agent selected from de-ionized water, methanol or acetonitrile.

Figure 7:
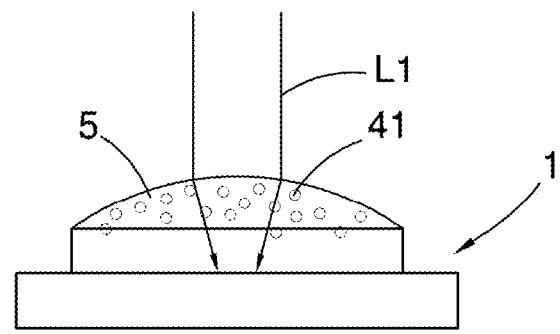
Figure 8:
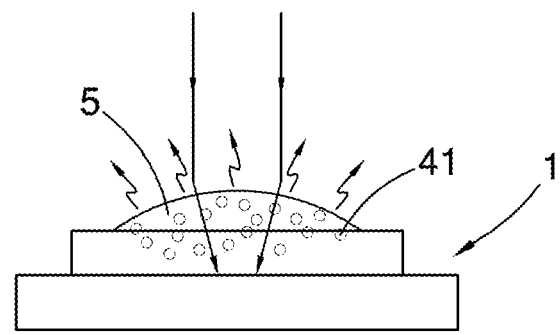
Figure 9:
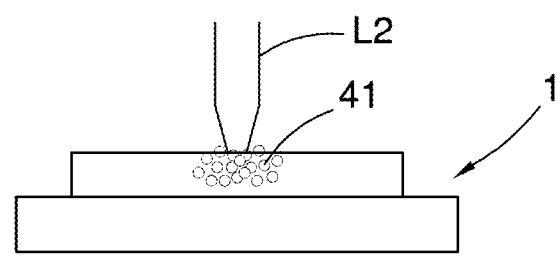

With reference to FIG. 7, the volatile organic solvent applied on the SERS substrate 1 is irradiated with infrared light L1 of relatively low energy for rapid evaporation of the organic solvent, as shown in FIG. 8. Because the aforementioned dissolving (step 203) uses highly volatile organic solvent as solvent, the non-aqueous solvent has a clean droplet surface which unlike water, is not easily polluted by surfactant, therefore, during the volatilization process, the organic solvent is able to cause surface tension gradient and form Marangoni flow within through thermal changes, so that leaving chemical molecules 41 will gradually condensed in a concentrated area (not numbered), as shown in FIG. 9. In other words, the aforementioned deposition of the organic solvent phenomenon is primarily concentrated on the concentrated area and not on the periphery, which is different from the liquid solvent that will cause edge effect or coffee-ring depositions effect. In order for the organic solvent to quickly evaporate, the infrared light L1 may have a wavelength range of 760 nm to 2000 nm and be generated by a light source with an output power no more than 1 mW.

Figure 10:
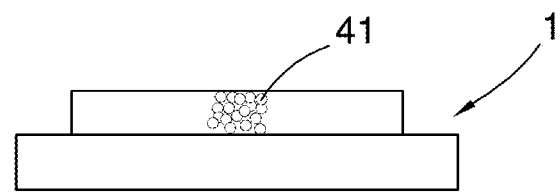

Subsequently, Referring to FIGS. 9 and 10, the concentrated area of the SERS substrate 1 is further irradiated with laser light L2 to have the chemical molecules 41 penetrate deeply into the concentrated area of the SERS substrate 1, forming a solid sample spot (not numbered) for measurement. The laser light L2 may have a single wavelength of about 760 nm to 1500 nm, and be generated from a laser light source with an output power no more than 500 mW, for enhancing the binding between the chemical molecules 41 and the metallic nano/microstructure 12.

Referring back to FIG. 1, the measurement stage is follow by the concentration stage which is to use laser beam generated by the laser light source 2 may be applied and focused on the solid sample spot, and measure the Raman spectroscopy. When the chemical molecules (pesticide molecules) absorbed by the nano silver particles on the SERS substrate is focused by the laser beam and excites Raman spectroscopy, due to different functional group, the Raman spectroscopy scattered has various characteristics, thus, one can use these characteristics to determine its chemical molecule structure.

It is suggested that the laser beam may have a wavelength of 1064 nm, 785 nm, 633 nm, 532 nm or 514 nm; and the Raman shift is measured in the wavenumber range of 200 $cm^{-1}$ to 4000 $cm^{-1}$.

It is noted that, once a droplet of the sample extract 4 is dropped on the SERS substrate 1, the target analyte (pesticide molecules) together with other non-target chemicals will be competitively absorbed in the SERS substrate 1. Thus, after the drying (step 202), not only the target analyte but also other chemicals may be evenly dispersed and absorbed in the SERS substrate 1. Subsequently, the volatile organic solvent is employed to dissolve the target analyte so that the target analyte may come out of the SERS substrate 1 (step 203). The target analyte is then irradiated with light for evaporation and concentration (step 204-205). With such a chemical substance concentration method, the target analyte (such as pesticide molecules) may be condensed effectively and therefore to enhance the Raman signal intensity. It shall also be noted that the volatile organic solvent is used not only for the dissolving the target analyte but also protecting the chemical molecules from degradation, which can prevent weak or error signals from being generated in the output of the instrument.

With the aforementioned SERS detection method, any agricultural products to be examined can be easily carried out by a simple extraction/cleanup and concentration, and then be measured and analyzed in-situ using the Raman Spectrometer in less than 10 minutes. This greatly improves the detection efficiency, and thus any unqualified products can be detected at the earliest possible time and restricted from entering the market.

Examples of the SERS detection method will be given below in detail:

Example 1: Analysis of Fenthion Pesticide

Figure 11:
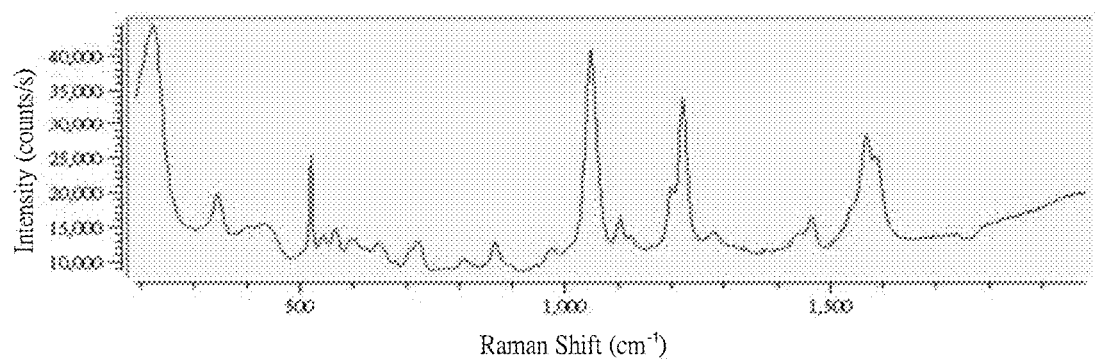
FIG. 11 is a Raman spectrum of Fenthion using the SERS detection method of the present invention.

FIG. 11 is a Raman spectrum of Fenthion pesticide. The sample to be detected is a Fenthion pesticide product (organothiophosphate) with a concentration of 50%. In the sample preparation, the sample" is firstly mixed with acetone to form a diluted sample solution with a concentration of 100 ppm, and the sample solution is then agitated for 30 seconds. Following this, a 0.5 ml of the sample solution is taken and put through a cleaning column filled with C18 and PSA power, and through a Nylon microporous filter with pore size of about 0.2 µm for cleanup. Subsequently, a micropipette is used to transport a 2 µL of the cleaned sample solution onto a SERS substrate and left it on for a while until the pesticide molecules are well absorbed by the silver nanopillars. The SERS substrate includes a silicon substrate, and silver nanopillars deposited on the silicon substrate. The silicon substrate has a size of 2.2 mm by 2.2 mm, and the silver nanopillars has a thickness of about 320 nm. Later, a 2 µL of volatile organic solvent of acetone/DI water (1:1, v/v) is used to dissolve the pesticide molecules. After that, the pesticide molecules dissolved in the volatile organic solvent is irradiated with 808 nm infrared laser light in power of about 200 mW to 300 mW to accelerate evaporation of the volatile organic solvent, leaving the condensed pesticide molecules on the SERS substrate. The condensed pesticide molecules are further irradiated with 785 nm infrared laser light in power of 100 mW in order to enhance the binding between the pesticide molecules and the silver nanopillars for instrumental measurement. During the Raman measurement, a 80 mW, 785 nm laser light source is used, the beam expansion ratio is 4×, the integration time is set to 500 ms and averaging number is set to 32. Through the measurement result, the Raman spectrum of the Fenthion pesticide reveals at least three characteristic peaks at approximately 1044 $cm^{-1}$, 1244 $cm^{-1}$ and 1569 $cm^{-1}$, which falls in line with the data of a standard Fenthion sample. It shall be noted that the peak at 520 $cm^{-1}$ represents the Raman signal caused by the silicon substrate, rather than the pesticide molecules. The whole process takes no more than 10 minutes for detecting the active ingredients in the pesticide products.

Example 2: Analysis of Carbaryl Pesticide

Figure 12:
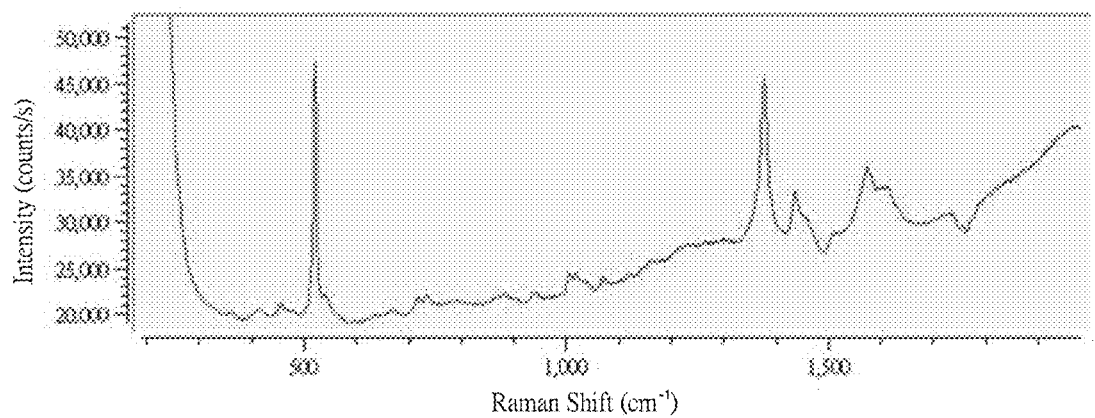
FIG. 12 is a Raman spectrum of Carbaryl using the SERS detection method of the present invention.

FIG. 12 is a Raman spectrum of Carbaryl pesticide. The sample to be detected is a Carbaryl pesticide product (carbamate) with a concentration of 85%. In the sample preparation, the sample is firstly mixed with acetone to form a diluted sample solution with a concentration of 100 ppm, and the sample solution is then agitated for 30 seconds. Following this, a 0.5 ml of the sample solution is taken and put through a cleaning column filled with C18 and PSA power, and through a Nylon microporous filter with pore size of about 0.2 µm for cleanup. Subsequently, a micropipette is used to transport a 2 µL of the cleaned sample solution onto a SERS substrate and left it on for a while until the pesticide molecules are well absorbed on the silver nanopillars. The SERS substrate includes a silicon substrate with a size of 2.2 mm by 2.2 mm, and silver nanopillars with a thickness of about 320 nm being deposited on the silicon substrate. Later, a 2 µL of volatile organic solvent of methanol/DI water (1:1, v/v) is used to dissolve the pesticide molecules. After that, the pesticide molecules dissolved in the volatile organic solvent is irradiated with 808 nm infrared laser light in power of about 200 mW to 300 mW to accelerate evaporation of the volatile organic solvent, leaving the condensed pesticide molecules on the SERS substrate. The condensed pesticide molecules are further irradiated with 785 nm infrared laser light in power of 100 mW in order to enhance the binding between the pesticide molecules and the silver nanopillars for instrumental measurement. During the Raman measurement, a 100 mW, 785 nm laser light source is used, together with the 4× lens, a 500 ms integration time and an average number of 32. As shown in FIG. 12, the Raman spectrum of the Carbaryl pesticide reveals at least two characteristic peaks at 1385 $cm^{-1}$ and 1420 $cm^{-1}$, falling in line with the data of a standard Carbaryl sample. It is understood that the peak at 520 $cm^{-1}$ represents the Raman signal caused by the silicon substrate, rather than the pesticide molecules.

Figure 13:
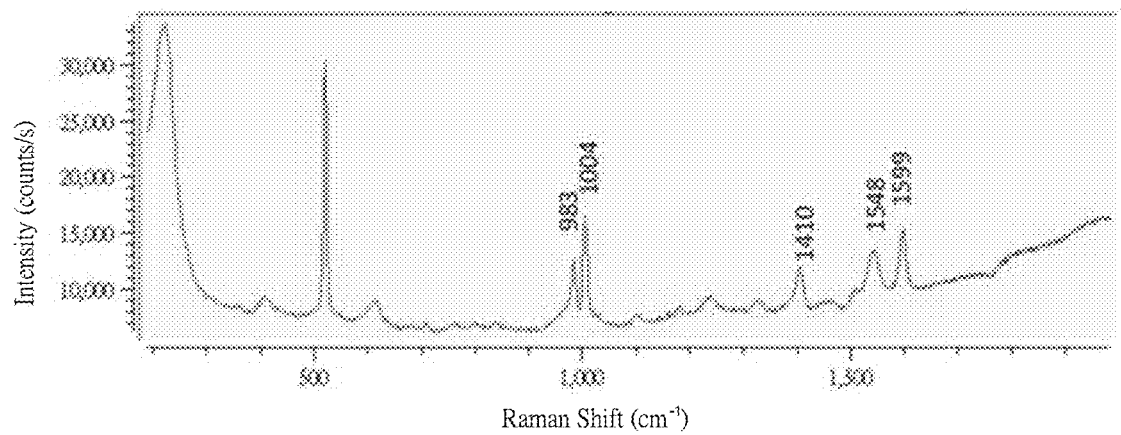
FIG. 13 is a Raman spectrum of Triazophos using a conventional SERS detection method.
Figure 14:
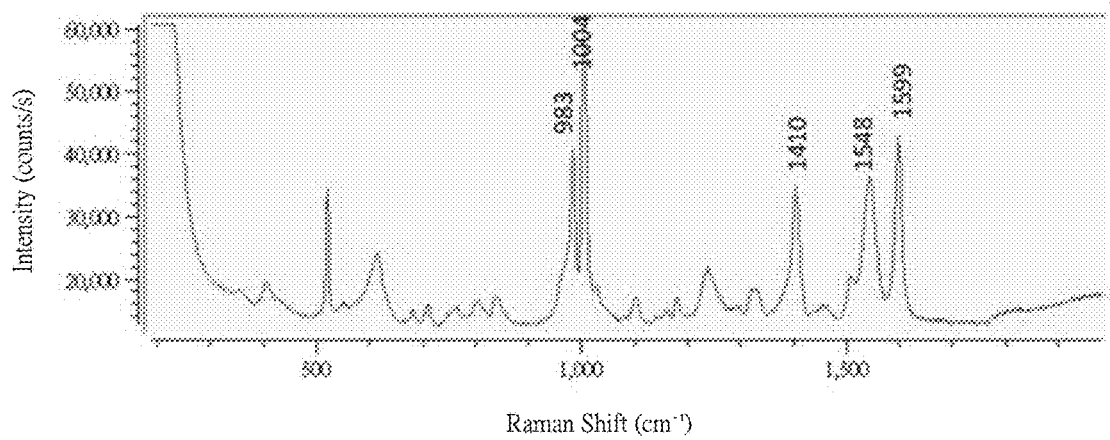
FIG. 14 is a Raman spectrum of Triazophos using the SERS detection method of the present invention.

Example 3: Comparison of Measured Results of Triazophos Pesticide Prepared with and without Concentration FIG. 13 is Raman spectra of Triazophos pesticide. The sample to be detected is a Triazophos pesticide product. In the sample preparation, the sample is firstly mixed with acetone to form a diluted sample solution with a concentration of 10 ppm, and the sample solution is then agitated for 30 seconds. Following this, a 0.5 ml of the sample solution is taken and put through a cleaning column filled with C18 and PSA power, and through a Nylon microporous filter with pore size of about 0.2 µm for cleanup. Subsequently, a micropipette is used to transport a 2 µL of the cleaned sample solution onto a SERS substrate and left it on for a while until the pesticide molecules are well absorbed on the silver nanopillars. Right after the drying, the sample may be directly measured by the Raman Spectrometer to get a spectrum as shown in FIG. 13. Alternatively, after the drying, the sample on the SERS substrate may further be dissolved and condensed as taught earlier, and then finally measured by the Raman Spectrometer to get a spectrum as shown in FIG. 14. In other words, The former measurement is provided herein to serve as a reference to the latter one.

More specifically, after the drying, a 2 µL of volatile organic solvent of methanol/DI water (1:1, v/v) may be further employed to dissolve the pesticide molecules. The dissolved pesticide molecules is irradiated with 808 nm infrared laser light in power of about 200 mW to 300 mW to accelerate evaporation of the volatile organic solvent, leaving the condensed pesticide molecules on the SERS substrate. And, the condensed pesticide molecules are further irradiated with 785 nm infrared laser light in power of 100 mW to enhance the binding between the pesticide molecules and the silver nanopillars for instrumental measurement. During the Raman measurement, a 80 mW, 785 nm laser light source is used, together with the 4× lens, a 500 ms integration time and an average number of 32. As shown in FIG. 14, the Raman spectrum of the Triazophos pesticide with the post-treatment of the dissolving and concentration reveals at least five characteristic peaks at 983 $cm^{-1}$, 1004 $cm^{-1}$, 1410 $cm^{-1}$, 1548 $cm^{-1}$ and 1599 $cm^{-1}$, falling in line with the data of a standard Triazophos sample. Most importantly, the signal intensity in FIG. 14 appears to be approximately 5 times of that in FIG. 14, showing that the SERS detection method of the present invention truly can greatly enhance the Raman signal intensity and improve the measurement quality.

Example 4: Analysis of Multi-Pesticide Residues in Crops

Figure 15:
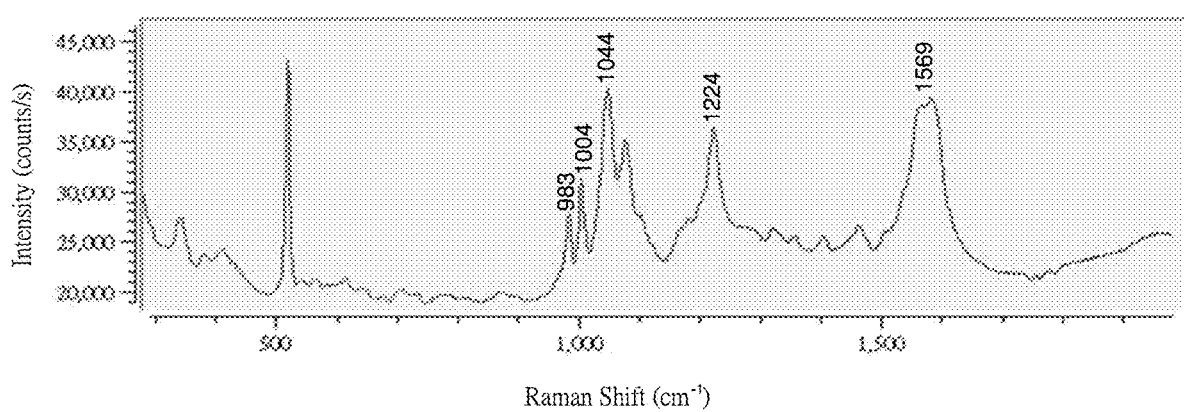
FIG. 15 is a Raman spectrum of Triazophos and Fenthion using the SERS detection method of the present invention.

FIG. 15 is a Raman spectrum of Triazophos and Fenthion residues in a rice sample. It is known that, after threshing and winnowing, the clean white or brown rice generally contains less than 5 ppm of pesticide residues. Thus, in this example, the rice sample to be detected is selected to be clean rice grains added with 5 ppm of Triazophos and 5 ppm of Fenthion. In the sample preparation, 10 grams of the sample is obtained and mixed with acetone to form a diluted sample solution, and the sample solution is then agitated for 30 seconds. Following this, a 1 ml of the sample solution is taken and put through a cleaning column filled with powers of C18, PSA, MgSO4 and GCB for cleanup. Subsequently, a micropipette is used to transport a 2 μL of the cleaned sample solution onto a SERS substrate with 320 nm silver nanopillars and left it on for a while until the pesticide molecules are well absorbed on the silver nanopillars. Later, a 2 μL of volatile organic solvent of methanol/DI water (1:1, v/v) is used to dissolve the pesticide molecules. After that, the dissolved pesticide molecules is irradiated with 808 nm infrared laser light in power of about 200 mW to 300 mW to accelerate evaporation of the volatile organic solvent, leaving the condensed pesticide molecules on the SERS substrate. The condensed pesticide molecules are further irradiated with 785 nm infrared laser light in power of 100 mW in order to enhance the binding between the pesticide molecules and the silver nanopillars for instrumental measurement. During the Raman measurement, a 100 mW, 785 nm laser light source is used, together with the 4× lens, a 500 ms integration time and an average number of 32. As shown in FIG. 15, the Raman spectrum of the rice sample reveals at least two characteristic peaks at 983 cm-1 and 1004 cm-1, falling in line with the data of a standard Triazophos sample, and at least three characteristic peaks at 1044 cm-1, 1224 cm-1 and 1569 cm-1, falling in line with the data of a standard Fenthion sample. Besides, it is noted that the peak intensity may further be related to the concentration of the pesticide residues for semi-quantitative measurement. Thus, the SERS detection method of the present invention can also be used to detect multi-pesticide residues in food products or agricultural products.

It should be evident that this disclosure is by way of example and that various changes may be made by adding, modifying or eliminating details without departing from the fair scope of the teaching contained in this disclosure.

What is claimed is:

1. A surface-enhanced Raman scattering (SERS) detection method, comprising:
    (a). obtaining a sample extract from extracting and cleaning a sample;
    (b). introducing the sample extract onto a SERS substrate so that chemical molecules of the sample extract is absorbed in the SERS substrate; (c). introducing a highly volatile organic solvent onto the SERS substrate that has absorbed the chemical molecules of the sample extract, whereby the chemical molecules of the sample extract dissolves in the volatile organic solvent and comes out of the SERS substrate;
    (d). irradiating the SERS substrate with light to evaporate the volatile organic solvent, leaving condensed chemical molecules in a concentrated area of the SERS substrate;
    (e). irradiating the concentrated area of the SERS substrate with laser light to have the condensed chemical molecules penetrate deeply into the concentrated area of the SERS substrate, forming a solid sample spot for measurement; and
    (f). performing Raman measurement with a laser beam focusing on the solid sample spot of the SERS substrate to analyze the condensed chemical molecules.

2. The SERS detection method as recited in claim 1, wherein in step (a), in order to obtain the sample extract, the sample is extracted by using a reagent selected from the group consisting of acetone, methanol, acetonitrile, and acetonitrile/acetic acid solution.

3. The SERS detection method as recited in claim 1, wherein in step (a), the sample is extracted with organic solvent and then put through a cleanup column and a microporous filter in sequence to get the sample extract.

4. The SERS detection method as recited in claim 1, wherein in step (c), the volatile organic solvent is a diluted solution including a diluting agent and a material selected from the group consisting of acetone, methanol and ethanol.

5. The SERS detection method as recited in claim 4, wherein the diluting agent is selected from the group consisting of de-ionized water, methanol and acetonitrile.

6. The SERS detection method as recited in claim 5, wherein in step (d), the light for irradiating the SERS substrate is infrared light with a wavelength of about 760 nm to 2000 nm; and in step (e), the laser light for irradiating the concentrated area of the SERS substrate has a wavelength of about 760 nm to 1500 nm, and is generated from a laser light source with an output power no more than 500 mW.

7. The SERS detection method as recited in claim 6, wherein in step (e), the laser light for irradiating the concentrated area of the SERS substrate has a single wavelength.

8. A chemical substance concentration method, comprising the following steps:
    (a). introducing a sample solution onto a metallic substrate, whereby chemical molecules of the sample solution are absorbed in the metallic substrate;
    (b). introducing a highly volatile organic solvent onto the metallic substrate, whereby the chemical molecules in the metallic substrate dissolve in the volatile organic solvent and come out of the metallic substrate; and
    (c). evaporating the volatile organic solvent in order to concentrate the chemical molecules in a concentrated area of the metallic substrate.

9. The chemical substance concentration method as recited in claim 8, wherein in step (c), the volatile organic solvent on the metallic substrate is irradiated with infrared light for the rapid evaporation.

10. The chemical substance concentration method as recited in claim 9, wherein after the step (c), the concentrated area of the metallic substrate is further irradiated with infrared laser light to have the chemical molecules penetrate deeply into the metallic substrate.

* * * * *